United States Patent
Amisano et al.

(10) Patent No.: US 6,424,903 B1
(45) Date of Patent: Jul. 23, 2002

(54) VEHICLE CLUTCH CONTROL DEVICE

(75) Inventors: Fabrizio Amisano, Turin; Giovanni Tornatore, S. Benigno Canavese; Cesare Sola, Valperga; Mauro Velardocchia, Turin, all of (IT)

(73) Assignee: Magneti Maralli Powertrain S.p.A. (IT)

( * ) Notice: Subject to any disclaimer, the term of this patent is extended or adjusted under 35 U.S.C. 154(b) by 0 days.

(21) Appl. No.: 09/909,874

(22) Filed: Jul. 23, 2001

(30) Foreign Application Priority Data

Jul. 25, 2000 (IT) .......................... TO00A0735

(51) Int. Cl.⁷ ............................................. H02P 27/30
(52) U.S. Cl. ............................ 701/67; 701/68; 477/80; 477/86; 477/175; 477/180
(58) Field of Search ................. 701/67, 68; 477/175, 477/86, 174, 180, 176, 80

(56) References Cited

U.S. PATENT DOCUMENTS

| | | | | |
|---|---|---|---|---|
| 4,518,064 A | * | 5/1985 | Windsor ................... | 192/3.58 |
| 4,671,397 A | | 6/1987 | Asagi et al. ............. | 192/0.052 |
| 4,678,069 A | * | 7/1987 | Yoshimura et al. ...... | 192/0.033 |
| 5,083,647 A | * | 1/1992 | Bulgrien .................. | 192/3.58 |
| 5,283,738 A | * | 2/1994 | Schwab et al. .......... | 74/866 |
| 6,253,140 B1 | * | 6/2001 | Jain et al. ................ | 701/67 |
| 6,309,325 B1 | * | 10/2001 | Baer et al. ............... | 477/174 |
| 6,318,530 B1 | * | 11/2001 | Asada ...................... | 192/3.58 |
| 6,369,539 B1 | * | 4/2002 | Morimoto et al. ........ | 318/369 |

FOREIGN PATENT DOCUMENTS

DE 19810923 9/1999

OTHER PUBLICATIONS

Patent Abstract of Japan, Pub. No. 2000130474, Pub. Date May 12, 2000.

* cited by examiner

Primary Examiner—William A. Cuchlinski, Jr.
Assistant Examiner—Tuan C To
(74) Attorney, Agent, or Firm—Hall, Priddy, Myers & Vande Sande

(57) ABSTRACT

A control device for controlling a clutch of a vehicle wherein an actuator is connected to and provides for operating the clutch, the work position of which is determined by a position sensor which supplies a measured position signal to a control device receiving an information signal and supplying a control signal for the actuator; the control device has a monitor circuit for determining malfunctioning of the position sensor and supplying a fault signal; and a virtual sensor device for estimating the work position of the clutch to supply the control device, in the presence of the fault signal, with a virtual position signal instead of the measured position signal.

5 Claims, 6 Drawing Sheets

VEHICLE CLUTCH CONTROL DEVICE

The present invention relates to a vehicle clutch control device.

BACKGROUND OF THE INVENTION

As is known, when releasing and engaging the clutch, e.g. when changing gear and starting the vehicle, the torque transmitted from the engine to the drive wheels via the clutch mainly depends on the load acting on the clutch disk, which in turn depends on the position of the clutch control lever.

The clutch is normally operated manually by the driver of the vehicle, who controls engagement of the clutch to transfer the torque via the clutch substantially gradually so the vehicle runs smoothly.

The clutch can also be operated fully automatically by means of electronic control devices, which, when operating the clutch, control the position of the clutch control lever according to a number of input signals.

Known control devices normally comprise an electronic central control unit, which receives control signals and controls release/engagement of the clutch by means of a solenoid valve supplied with pressurized fluid by a hydraulic circuit and which, on the basis of the incoming signals, operates an actuator connected to the clutch.

Control devices also comprise a position sensor connected to the actuator and generating a feedback signal related to the operating position of the actuator; and a control circuit installed in the electronic central control unit and supplied with the feedback signal, on the basis of which a control signal is supplied to the solenoid valve.

More specifically, the control circuit comprises a computing circuit, which receives a number of information signals (i.e. quantities, such as accelerator pedal position, engine speed, clutch speed, brake pedal position, etc.) and supplies a reference signal indicating the position of the clutch.

The control circuit also comprises an adding circuit, which receives the feedback signal from the position sensor and the position reference signal, and supplies an error signal to an input of a controller (e.g. PID proportional-integral-derivative) circuit, which in turn supplies the solenoid valve control signal to operate the clutch actuator.

A major drawback of known control devices is that, in the event of a fault on the position sensor, the control circuit is supplied with an erroneous feedback signal, thus resulting in an incorrect control signal being supplied to the solenoid valve.

As a result, operation of the actuator becomes erratic, difficult and/or impossible, and poses obvious safety hazards caused by failure to release/engage the clutch.

SUMMARY OF THE INVENTION

It is an object of the present invention to provide a vehicle clutch control device designed to control the clutch actuator assembly even in the event of a fault on the position sensor.

BRIEF DESCRIPTION OF THE DRAWINGS

A non-limiting embodiment of the invention will be described by way of example with reference to the accompanying drawings, in which.

DETAILED DESCRIPTION OF THE INVENTION

Figure 1:
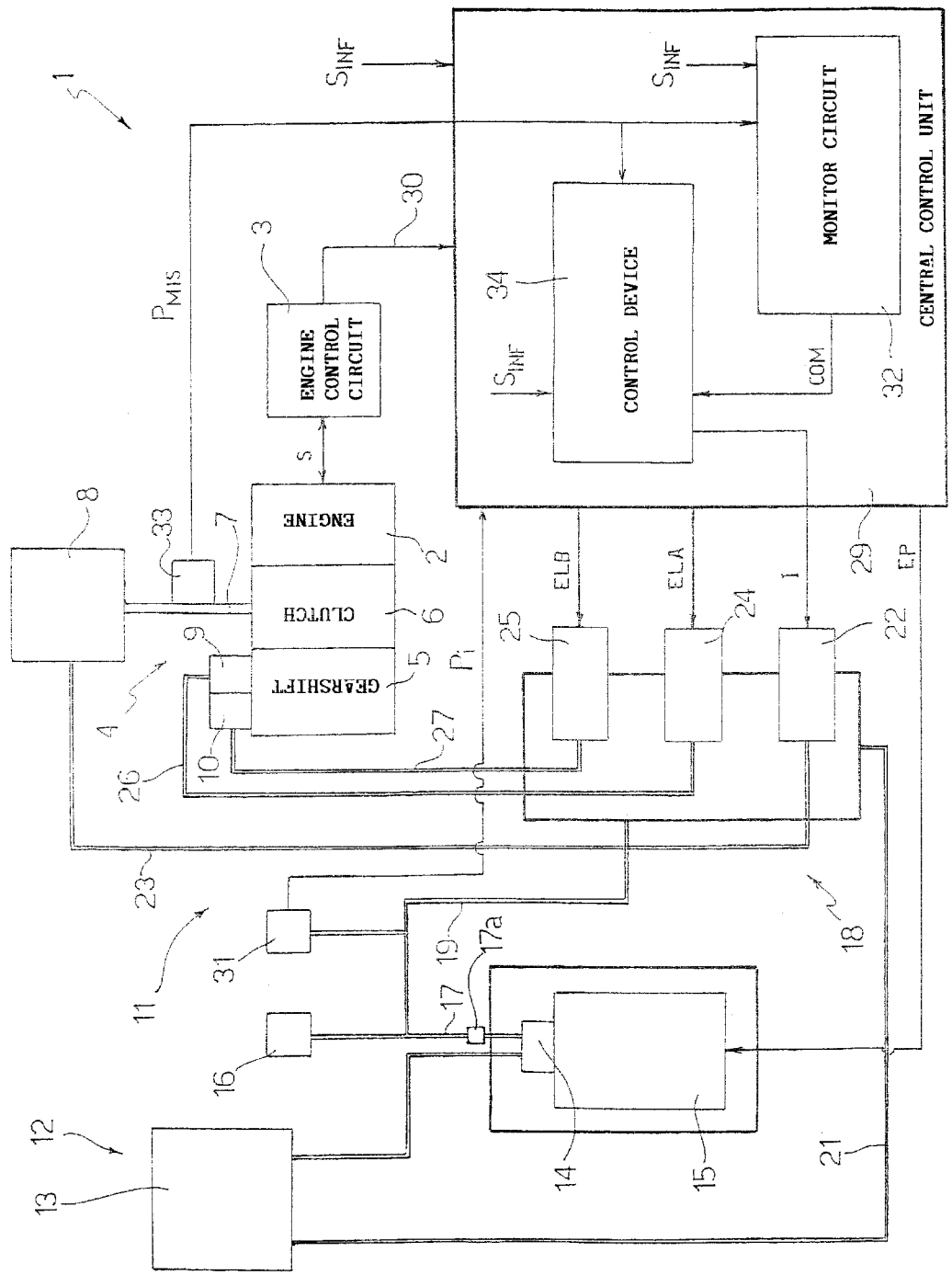
FIG. 1 shows a block diagram of a first embodiment of a control device in accordance with the teachings of the present invention.

Number 1 in FIG. 1 indicates as a whole a first embodiment of a control device cooperating with an internal combustion, e.g. petrol or diesel, engine 2 (shown schematically).

Engine 2 cooperates with an electronic engine control circuit 3, which receives a number of information parameters S measured principally on engine 2, and supplies control signals for an ignition system (not shown) and an injection system (not shown).

Engine 2 supplies mechanical power via a shaft (not shown) to an automatic transmission 4 comprising a gearshift 5 and a clutch 6 interposed between the output shaft (not shown) of engine 2 and the input shaft of gearshift 5, which supplies mechanical power to the wheels of the vehicle (not shown).

More specifically, clutch 6 is connected by a control lever 7 to a first actuator 8 for releasing and engaging clutch 6; and gearshift 5 is associated with a second and a third actuator 9, 10 for respectively controlling selection and engagement/disengagement of the gears by gearshift 5.

More specifically, control lever 7 provides for adjusting in known manner the load acting on a disk (not shown) of clutch 6, ad hence the torque transmitted via clutch 6.

The first, second and third actuator 8, 9 and 10 are supplied with pressurized working fluid by a hydraulic circuit 11.

More specifically, hydraulic circuit 11 comprises:

a working fluid source 12 defined by a tank 13 containing oil;

a pump 14 operated by an electric motor 15 and supplied with working fluid from tank 13;

a hydraulic accumulator 16 supplied with working fluid from pump 14 along a feed conduit 17 connected to a one-way valve 17a;

a valve assembly 18 supplied along a conduit 19 with pressurized working fluid from hydraulic accumulator 16;

a recirculating conduct 21 extending between a recirculating output of valve assembly 18 and an input of tank 13.

Valve assembly 18 comprises a first solenoid valve 22, in this case a 3-way, 2-position solenoid valve, connected by a conduit 23 to first actuator 8 to supply the fluid required to operate the first actuator releasing/engaging clutch 6; and a second and third solenoid valve 24, 25 connected by respective conduits 26, 27 to second and third actuators 9, 10 respectively, to supply the fluid required to operate gearshift 5.

Valve assembly 18 receives a number of control signals from an electronic central control unit 29 for controlling operation of first, second and third actuators 8, 9, 10. More specifically, first solenoid valve 22 is. current driven by electronic central control unit 29 by means of a control signal I; while second and third solenoid valves 24 and 25 are controlled by electronic central control unit 29 by means of respective control signals ELA, ELB.

Electronic central control unit 29 cooperates with electronic engine control circuit 3, to which it is connected over a two-way data transmission line 30, and is also connected to a pressure sensor 31 located along conduit 19 and for supplying electronic central control unit 29 with a signal Pi corresponding. to the input fluid pressure of solenoid valves 22, 24, 25.

By means of a signal EP, electronic central control unit 29 controls on/off cycles of electric motor 15, which turns pump 14 on/off to ensure a minimum pressure value in hydraulic accumulator 16.

Electronic central control unit 29 comprises a known monitor circuit 32 for diagnosing operation of a position sensor 33 connected to control lever 7 and generating a measured position signal $P_{MIS}$ related to the operating position of first actuator 8 and therefore to the position of control lever 7 of clutch 6. Alternatively, position sensor 33 may be connected to a thrust bearing (not shown) of clutch 6, in which case, position sensor 33 supplies the position of the thrust bearing. Signal $P_{MIS}$ supplied by position sensor 33 and related to the position of control lever 7 gives an indication of the torque transmitted by the clutch, which, as is known, depends on the position of the control lever via a transmissibility curve.

Monitor circuit 32 is connected to position sensor 33 to receive measured position signal $P_{MIS}$ and to supply a signal COM having a first logic value when monitor circuit 32 diagnoses a fault on position sensor 33, and a second logic value when position sensor 33 is diagnosed as operating correctly.

Electronic central control unit 29 also comprises a control device 34, which receives a number of information signals $S_{INF}$ to generate control signal I driving first solenoid valve 22, and therefore to control first actuator 8 and adjust the position of control lever 7.

Information signals $S_{INF}$ governing generation of control signal I are related to operating and status quantities of the vehicle (not shown), i.e. quantities such as the posit-on of the accelerator pedal (not shown) and the speed of engine 2 and clutch 6.

Figure 2:
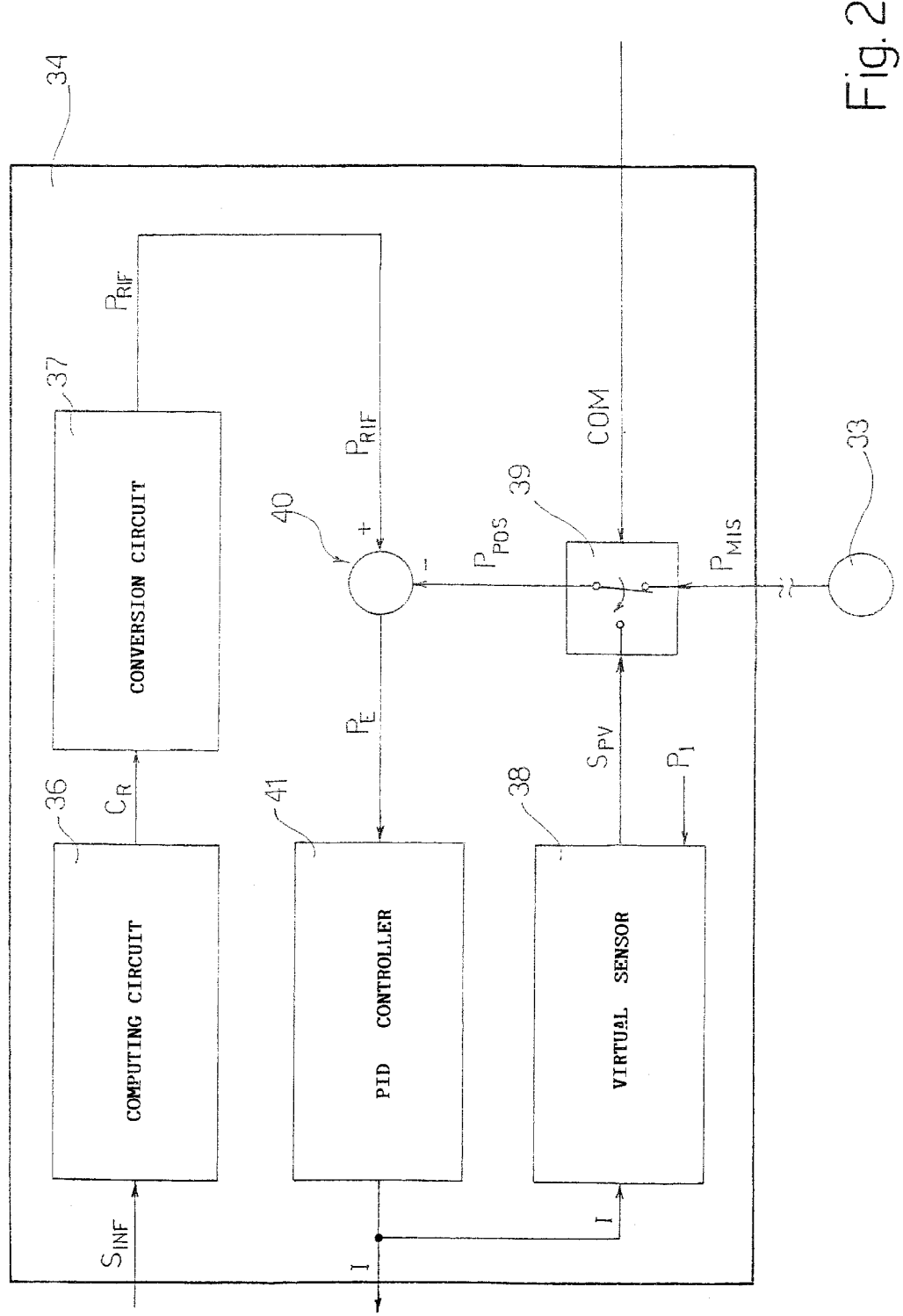
FIG. 2 shows a block diagram of a component of the FIG. 1 control device.

With reference to FIG. 2, control device 34 comprises a known computing circuit 36, which receives information signals $S_{INF}$ and supplies a torque demand signal $C_R$ calculated in known manner as a function of information signals $S_{INF}$.

Control device 34 also comprises a known conversion circuit. 37, which receives the torque demand signal $C_R$ from computing circuit 36 and generates, on the basis of torque demand signal $C_R$, a reference position signal $P_{RIF}$ indicating the position of control lever 7 of clutch 6.

Reference position signal $P_{RIF}$ is calculated by means of a transmissibility function $FT(C_R)$ of clutch 6 stored in a memory (not shown) of electronic central control unit 29. More specifically, the memory (not shown) stores a table containing a number of numeric values defining the transmissibility function $FT(C_R)$ of clutch 6, which provides for determining, for each value of signal $C_R$ indicating the torque to be transmitted to the vehicle wheels via clutch 6, the reference position signal $P_{RIF}$ indicating the position assumed by control lever 7 of clutch 6.

More specifically, transmissibility function $FT(C_R)$ defines a biunique relationship between torque demand signal $C_R$ and reference position signal $P_{RIF}$ of first actuator 8 of clutch 6.

Control device 34 also comprises a virtual sensor device 38 (described in detail later on) for reconstructing, instant by instant and on the basis of control signal I, the work position of first actuator 8 and therefore of control lever 7, and for supplying a first input of a known switching device 39 with a virtual position signal $S_{PV}$ indicating the work position reconstructed by virtual sensor 38.

Switching device 39 receives, at a second input, the measured position signal $P_{MIS}$ supplied by position sensor 33, and, depending on the value of the switching signal COM received at a third input, supplies a position signal $P_{POS}$, which equals virtual position signal $S_{PV}$ ($P_{POS}=S_{PV}$) when switching signal COM has the first logic value (malfunction of position sensor 33), and equals measured position signal $P_{MIS}$ ($P_{POS}=P_{MIS}$) when switching signal COM has the second logic value (position sensor 33 operating correctly).

Control device 34 comprises an adding circuit 40 receiving reference position signal $P_{RIF}$ and position signal $P_{POS}$, and generating a position error signal $P_E$ equal to the difference between reference position signal $P_{RIF}$ and position signal $P_{POS}$.

Control device 34 also comprises a known, e.g. PID proportional-integral-derivative, control circuit 41 receiving position error signal $P_E$ and generating control signal I for controlling first solenoid valve 22 and so controlling. first actuator 8 and adjusting the position of control lever 7.

Figure 3:
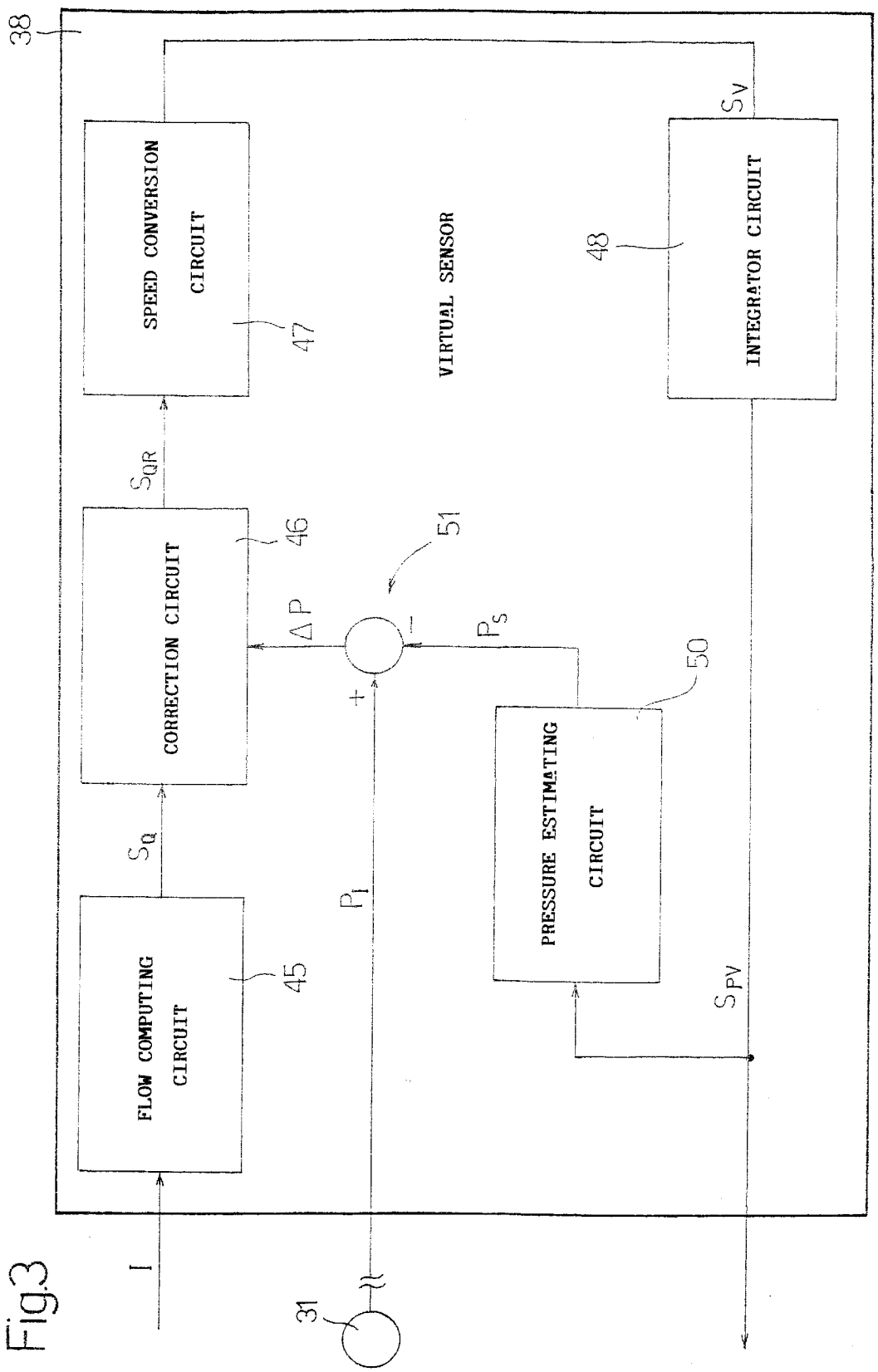
FIG. 3 shows a block diagram of a component of the FIG. 1 control device.

With reference to FIG. 3, virtual sensor device 38 comprises a flow computing circuit 45, which receives control signal I and, on the basis of the input signals, supplies a nominal flow signal $S_Q$.

Flow computing circuit 45 employs a table stored in a memory (not shown) of control device 34 and containing a number of numeric values defining a known characteristic function $Q_N(I)$ obtained experimentally by measuring the nominal fluid flow $Q_N$ supplied by first solenoid valve 22 to first actuator 8, as a function of control signal I, with clutch 6 released or engaged, and in the presence of a pressure difference $\Delta P$ (equivalent to the difference between the input and output pressure of first solenoid valve 22) equal to a reference pressure difference $\Delta P_{RIF}$ of fixed value, e.g. $\Delta P_{RIF}=10$ bar.

Nominal flow signal $S_Q$ indicates the nominal flow $Q_N$ supplied by first solenoid valve 22 and determined as a function of control signal I of first solenoid valve 22.

Virtual sensor device 38 also comprises a known correction circuit 46 receiving nominal flow signal $S_Q$ and supplying, on the basis of nominal flow signal $S_Q$, a real flow signal $S_{QR}$ indicating the real flow $Q_R$ supplied by first solenoid valve 22 and calculated for any pressure difference $\Delta P$ (e.g. $\Delta P \neq \Delta P_{RIF}=10$ bar) between the input and output of first solenoid valve 22. More specifically, correction circuit 46 calculates real flow signal $S_{QR}$ according to the equation:

$$S_{QR} = S_Q \sqrt{\frac{\Delta P}{\Delta P_{RIF}}}$$

Virtual sensor device 38 comprises a known speed conversion circuit 47 receiving real flow signal $S_{QR}$ and supplying, on the basis of the input signals, a speed signal Sv indicating the speed v of clutch 6.

More specifically, speed conversion circuit 47 calculates the speed v of clutch 6 in known manner by means of a known equation, which takes into account both real flow. $Q_R$ of the working fluid supplied by first solenoid valve 22, and the dimensions, in particular the section, of first actuator 8.

Virtual sensor device 38 also comprises an integrator circuit 48 receiving speed signal Sv and supplying virtual position signal $S_{PV}$ indicating the work position of first actuator 8 and therefore the position of control lever 7 of clutch 6. More specifically, virtual position signal $S_{PV}$ is calculated by means of the following integration:

$$S_{PV} = \int Sv \, dt$$

Virtual position signal $S_{PV}$ is also supplied to a pressure estimating circuit 50 for estimating the output pressure of first solenoid valve 22 in known manner on the basis of virtual position signal $S_{PV}$, and for supplying an estimated pressure signal $P_S$ to a first input of an adding circuit 51.

A second input of adding circuit 51 receives the pressure signal Pi supplied by pressure sensor 31 and indicating the input pressure of first solenoid valve 22.

Adding circuit 51 supplies pressure difference signal $\Delta P$ equal to the difference between pressure signal Pi and estimated pressure signal $P_S$ indicating the estimated pressure of the working fluid at the output of first solenoid valve 22.

Pressure estimating circuit 50 employs a table stored in the memory (not shown) of control device 34 and containing, for signal $P_S$ indicating the estimated pressure at the output of first solenoid valve 22, numeric values determined as a function of both the work position and state of clutch 6. More specifically, the table contains a number of numeric values defining a characteristic function $M(S_{PV})$ of the spring, e.g. Belleville washer (not shown), of clutch 6.

Characteristic function $M(S_{PV})$ provides for estimating, for each estimated position of control lever 7 of clutch 6, a corresponding pressure value measured at the output of first solenoid valve 22.

More specifically, characteristic function $M(S_{PV})$ of clutch 6 defines a biunique relationship between each instantaneous value $S_{PVi}$ of virtual position signal $S_{PV}$ and a corresponding instantaneous value $P_{Si}$ of signal $P_S$ indicating the estimated pressure at the output of first solenoid valve 22. The memory therefore stores a number of pairs of values, each pair relating to a respective position assumed by control lever 7 and comprising an instantaneous value $S_{PVi}$ of virtual position signal $S_{PV}$, and a corresponding instantaneous value $P_{Si}$ of signal $P_S$ indicating the estimated pressure at the output of first solenoid valve 22.

In actual use, control device 34 drives first solenoid valve 22 by means of control signal I, which is determined in known manner by control circuit 41 as a function of the difference between position signal $P_{POS}$ and reference position signal $P_{RIF}$ determined as a function of information signals $S_{INF}$.

More specifically, if position sensor 33 is operating correctly, switching signal COM supplied by monitor circuit 32 has the second logic value, so that switching device 39 keeps position signal $P_{POS}$ equal to measured position signal $P_{MIS}$ supplied by position sensor 33.

Conversely, in the event monitor circuit 32 detects a fault on position sensor 33, switching signal COM goes from the second to the first logic value and switches switching device 39, which supplies a position signal $P_{POS}$ of a value equal to the virtual position signal $S_{PV}$ supplied by virtual sensor device 38.

In this case, virtual sensor device 38 receives control signal I at the input of flow computing circuit 45, and, on the basis of the input signals, calculates nominal flow signal $S_Q$, which is supplied to an input of correction circuit 46.

Correction circuit 46 calculates real flow signal $S_{QR}$ as a function of nominal flow signal $S_Q$ and pressure difference $\Delta P$ (calculated and supplied by pressure estimating circuit 50), and supplies real flow signal $S_{QR}$ to the input of speed conversion circuit 47.

At this point, speed conversion circuit 47 calculates speed signal Sv on the basis of real flow signal $S_{QR}$, and supplies it to integrator circuit 48, which integrates speed signal Sv and supplies virtual position signal $S_{PV}$ to switching device 39.

Figure 4:
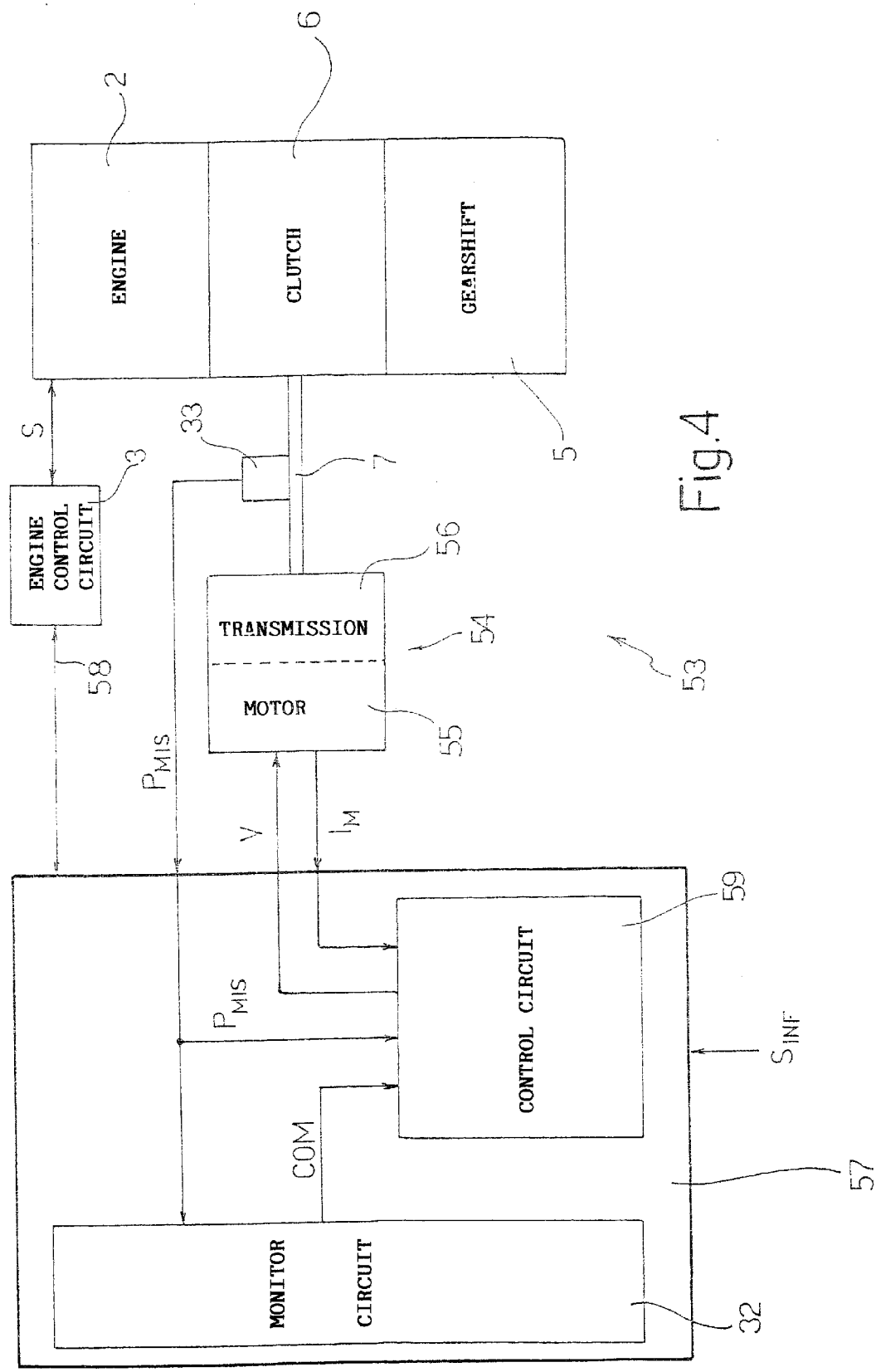
FIG. 4 shows a block diagram of a second embodiment of a control device in accordance with the teachings of the present invention.

Number 53 in FIG. 4 indicates as a whole a second embodiment of a control device similar to control device 1 described above, and the component parts of which are indicated using the same reference numbers as for the corresponding parts of control device 1.

Control device 53 provides for controlling control lever 7 (known type shown schematically) of clutch 6 by means of an electric actuator 54 comprising an electric motor 55 connected to control lever 7 by a known transmission 56 for converting rotation of electric motor 55 into linear motion of control lever 7 and, hence, of clutch 6.

Control device 53 comprises an electronic central control unit 57, which receives information signals SINE and a current signal $I_M$ indicating the current circulating in the windings (not shown) of electric motor 55, and generates, on the basis of the input signals, a control signal V, the value of which indicates the drive voltage of electric motor 55.

Electronic central control unit 57 is connected over a two-way data line 58 to electronic engine control circuit 3, and receives measured position signal $P_{MIS}$ supplied by position sensor 33, which is connected to control lever 7, and the measured position signal $P_{MIS}$ of which is related to the operating position of control lever 7.

Electronic central control unit 57 comprises, like electronic central control unit 29, a monitor circuit 32 for diagnosing operation of position sensor 33 in known manner; and a control circuit 59 receiving measured position signal $P_{MIS}$ and information signals $S_{INF}$, and generating control signal V.

Figure 5:
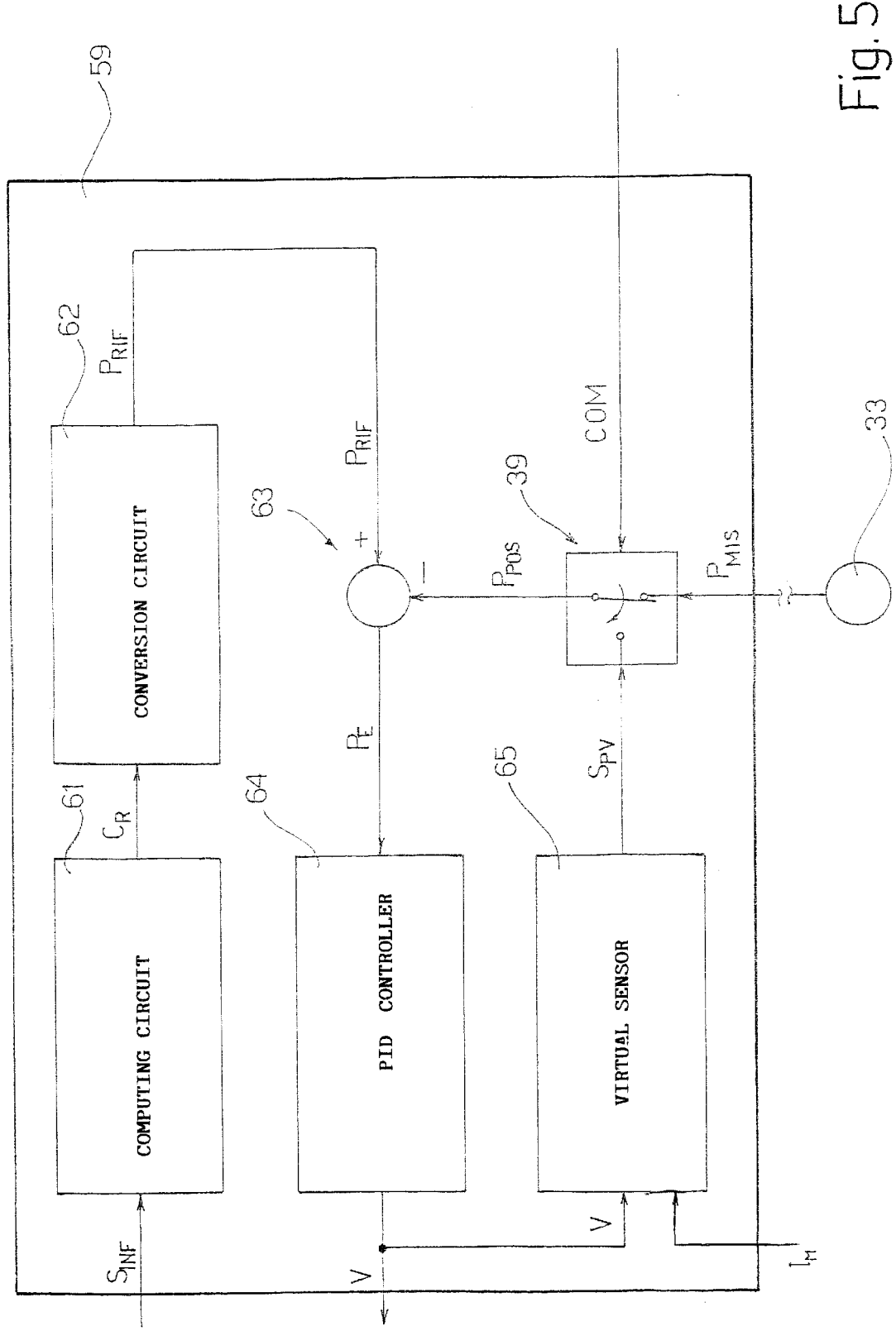
FIG. 5 shows a block diagram of a component of the FIG. 4 control device.

With reference to FIG. 5, control circuit 59 comprises a computing circuit 61 similar to computing circuit 36 and which receives information signal $S_{INF}$ and supplies torque demand signal $C_R$; a conversion circuit 62 similar to conversion circuit 37 and which receives torque demand signal $C_R$ and supplies reference position signal $P_{RIF}$; and an adding circuit 63 similar to adding circuit 40 and which supplies position error signal $P_E$ equal to the difference between reference position signal $P_{RIF}$ and position signal $P_{POS}$.

Control circuit 59 also comprises a known control circuit 64, e.g. a PID proportional-integral-derivative controller, receiving posit-on error signal $P_E$ from adding circuit 63 and generating voltage control signal V.

Position signal $P_{POS}$ is supplied by switching device 39, which, depending on the logic value of signal COM, selectively switches to the output the measured position signal $P_{MIS}$ supplied by position sensor 33, or the virtual position signal $S_{PV}$ supplied by a virtual sensor device 65.

Figure 6:
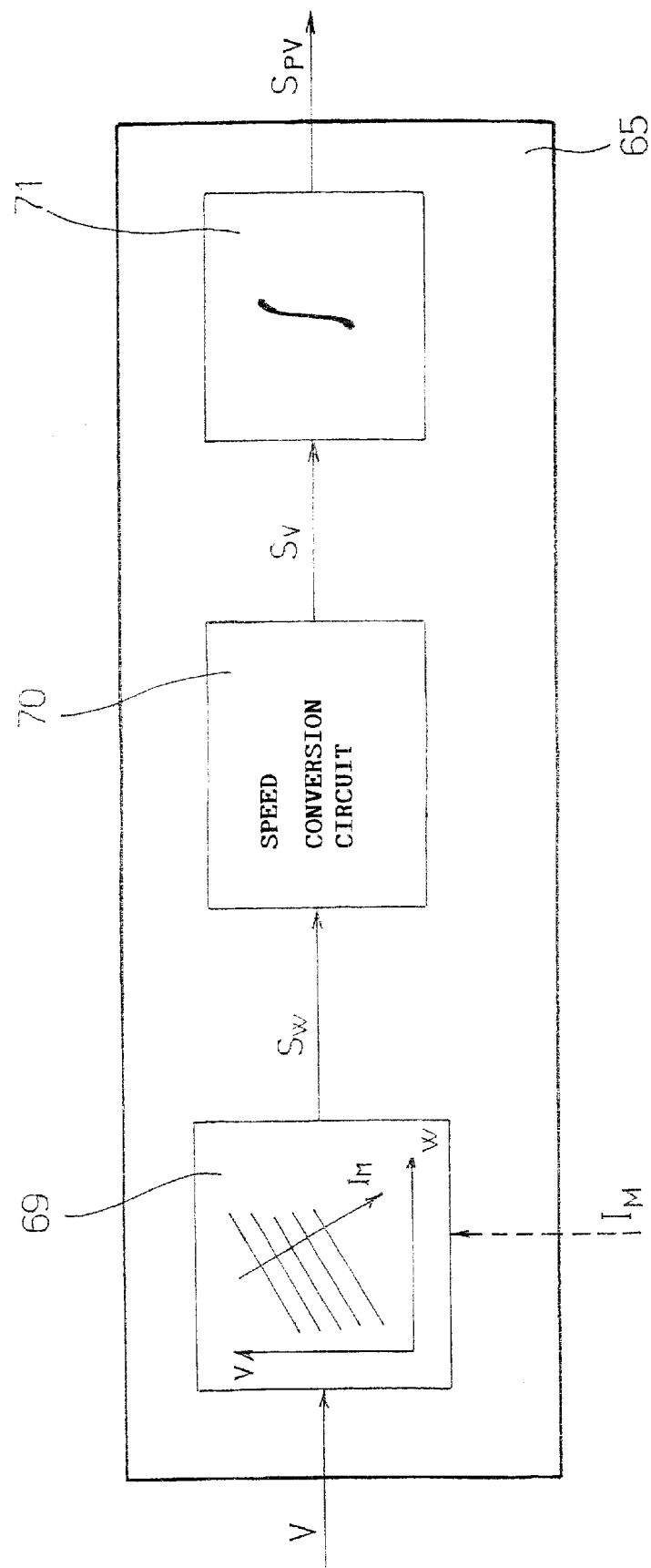
FIG. 6 shows a block diagram of a component of the FIG. 4 control device.

With reference to FIG. 6, virtual sensor device 65 comprises a speed computing circuit 69, which receives control signal V and current signal $I_M$ supplied by electric motor 55, and, on the basis of the input signals, supplies speed signal $S_W$ indicating the speed of electric motor 55.

More specifically, speed computing circuit 69 employs a table containing a number of numeric values defining a known characteristic function $S_w(I_M, V)$, which provides for estimating the value of speed signal $S_w$ of electric motor 55 as a function of the control voltage V of electric motor 55 and the electric current $I_M$ circulating in the windings (not shown) of electric motor 55.

Virtual sensor device 65 also comprises a known speed conversion circuit 70 receiving speed signal $S_w$ and supplying a speed signal $S_v$ indicating an estimated speed v of clutch 6.

More specifically, speed conversion circuit 70 calculates the speed of clutch 6 by means of a known equation taking into account the characteristics of transmission 56.

Virtual sensor device 65 also comprises an integrator circuit 71 receiving speed signal $S_v$ and supplying a virtual position signal $S_{PV}$ calculated according to the equation:

$$S_{PV} = \int S v \, dt$$

Control device 53 operates in the same way as control device 1. More specifically, control circuit 59 drives electric motor 55 by means of control signal V, which is determined by control circuit 64 as a function of the difference between position signal $P_{POS}$ and reference position signal $P_{RIF}$ determined as a function of information signals $S_{INF}$.

More specifically, if position sensor 33 is operating correctly, switching signal COM supplied by monitor circuit 32 has the second logic value, so that switching device 39 keeps position signal $P_{POS}$ equal to measured position signal $P_{MIS}$ supplied by position sensor 33.

Conversely, in the event monitor circuit 32 detects a fault on position sensor 33, switching signal COM goes from the second to the first logic value and switches switching device 39, which supplies a position signal $P_{POS}$ of a value equal to the virtual position signal $S_{PV}$ supplied by virtual sensor device 65.

In this case, virtual sensor device 65 receives control signal V and current signal $I_M$, and, on the basis of the input signals, calculates virtual position signal $S_{PV}$.

Control device 1 has the advantage of supplying a correct control signal to first solenoid valve 22, even in the event of a fault on position sensor 33, thus ensuring precise operation of first actuator 8 and eliminating the risk of clutch 6 . not being released/engaged.

Clearly, changes may be made to the control device as described herein without, however, departing from the scope of the accompanying Claims.

What is claimed is:

1. A control device (1, 53) for controlling a clutch (6) of a vehicle wherein an actuator (8) is connected to said clutch (6) and provides for operating the clutch (6); said device (1, 53) comprising sensor means (33) for determining the position of said clutch (6) and supplying a measured position signal ($P_{MIS}$); and control means (34, 59) receiving information signals ($S_{INF}$) and said measured position signal ($P_{MIS}$), and supplying a control signal (1, V) for said actuator (8);

said device (1, 53) being characterized by comprising:

monitoring means (32) for determining malfunctioning of said sensor means (33) and supplying a fault signal (COM); and estimating means (38) for estimating the work position of said clutch (6) to supply said control means (34, 59), in the presence of said fault signal (COM), with a virtual position signal ($S_{PV}$) instead of said measured position signal ($P_{MIS}$).

2. A control device (1) as claimed in claim 1, characterized in that said estimating means (38) comprise:

converting means receiving said control signal (I, V) and supplying a speed signal ($S_v$) related to the speed of the clutch (6);

integrating means (48, 71) receiving said speed signal ($S_v$) and generating said virtual position signal ($S_{PV}$).

3. A control device (1) as claimed in claim 2, characterized in that said converting means comprise:

flow computing means (45) receiving said control signal (I, V) and generating a nominal flow signal ($S_Q$) related to the nominal flow ($Q_N$) at the output of a solenoid valve (22) connected to said actuator (8);

correcting means (46) receiving said nominal flow signal ($S_Q$) and a pressure difference signal ($\Delta P$) indicating the difference between a first pressure (Pi) measured at the input of said solenoid valve (22), and an estimated second pressure ($P_S$) at the output of said solenoid valve (22); said correcting means (46) generating a real flow signal ($S_{QR}$) indicating the real fluid flow at the output of said solenoid valve (22); and speed converting means (47, 70) receiving said real flow signal ($S_{QR}$) and generating said speed signal ($S_v$).

4. A control device (1) as claimed in claim 3, characterized in that said converting means comprise:

a pressure estimating circuit (50) receiving said virtual position signal and supplying an estimated second pressure signal ($P_S$); and an adding circuit (51) receiving a first pressure signal (Pi) at a first input, and said estimated second pressure signal ($P_S$) at a second input, and supplying said pressure difference signal ($\Delta P$).

5. A control device (1) as claimed in claim 2, characterized in that said actuator (8) comprises an electric motor (55); said converting means comprising:

speed computing means (69) receiving said control signal (I, V) and a current signal ($I_M$) indicating the current in said electric motor (55), and generating a speed signal ($S_w$) indicating the speed of the electric motor (55); and a speed converting circuit (70) receiving said speed signal ($S_w$) and generating said speed signal ($S_v$) indicating the speed of the clutch (6).

* * * * *

UNITED STATES PATENT AND TRADEMARK OFFICE
CERTIFICATE OF CORRECTION

PATENT NO.    : 6,424,903 B1
DATED         : July 23, 2002
INVENTOR(S)   : Amisano et al.

It is certified that error appears in the above-identified patent and that said Letters Patent is hereby corrected as shown below:

<u>Title page,</u>
Item [73], Assignee, delete "Maralli", and insert -- Marelli --.

Signed and Sealed this

Fourth Day of February, 2003

JAMES E. ROGAN
*Director of the United States Patent and Trademark Office*